(12) United States Patent
Lee et al.

(10) Patent No.: US 9,195,096 B2
(45) Date of Patent: Nov. 24, 2015

(54) LIQUID CRYSTAL DISPLAY APPARATUS AND METHOD OF MANUFACTURING THE SAME

(71) Applicant: Samsung Display Co., LTD., Yongin, Gyeonggi-Do (KR)

(72) Inventors: Sang-Gu Lee, Hwaseong-si (KR);
Seung-Beom Park, Hwaseong-si (KR);
Na-Young Shin, Hwaseong-si (KR);
Jung-Hun Lee, Seoul (KR);
Kyung-Hwan Jeon, Hwaseong-si (KR);
Hyo-Sung Hong, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/200,448

(22) Filed: Mar. 7, 2014

(65) Prior Publication Data

US 2015/0070638 A1   Mar. 12, 2015

(30) Foreign Application Priority Data

Sep. 11, 2013   (KR) ........................ 10-2013-0109374

(51) Int. Cl.
*C09K 19/00* (2006.01)
*G02F 1/13363* (2006.01)
*G02F 1/1333* (2006.01)

(52) U.S. Cl.
CPC .......... *G02F 1/13363* (2013.01); *G02F 1/1333* (2013.01); *Y10T 428/10* (2015.01); *Y10T 428/1036* (2015.01)

(58) Field of Classification Search
CPC ........ G02B 5/30; G02B 5/3016; G02B 5/305; G02B 5/3083; G02B 5/32; G02B 5/3033; G02F 1/133528; G02F 1/13363; G02F 1/133632; G02F 2001/133633; B32B 2307/42; Y10T 428/10; Y10T 428/1036
USPC ............. 428/1.1, 1.3, 1.31; 349/110, 117, 96, 349/182; 445/24; 359/489.06, 489.07
See application file for complete search history.

(56) References Cited

U.S. PATENT DOCUMENTS

| 7,393,569 | B2 | 7/2008 | Ito et al. |
| 8,289,494 | B2 | 10/2012 | Parri et al. |
| 2006/0221282 | A1* | 10/2006 | Suemasu et al. ............. 349/117 |
| 2009/0180059 | A1* | 7/2009 | Fukuda et al. ................. 349/96 |
| 2010/0328583 | A1 | 12/2010 | Hiruma et al. |
| 2011/0147659 | A1 | 6/2011 | Adlem et al. |

FOREIGN PATENT DOCUMENTS

| JP | 2012155308 A | 8/2012 |
| JP | 2012173609 A | 9/2012 |
| JP | 2012177087 A | 9/2012 |
| KR | 1020120007969 A | 1/2012 |
| KR | 1020120031440 A | 4/2012 |

OTHER PUBLICATIONS

Grampel, "Surfaces of fluorinated polymer systems", May 2015, Retrieved from internet.*
Search Report for Application LA-201304-687-1 dated May 17, 2013.

* cited by examiner

*Primary Examiner* — Ruiyun Zhang
(74) *Attorney, Agent, or Firm* — Cantor Colburn LLP (57) ABSTRACT

A liquid crystal display apparatus includes a first substrate, a second substrate disposed opposite to the first substrate, a liquid crystal layer and a phase difference compensation film disposed on the first substrate, where the phase difference compensation film includes a fluorine resin.

12 Claims, 6 Drawing Sheets

LIQUID CRYSTAL DISPLAY APPARATUS AND METHOD OF MANUFACTURING THE SAME

This application claims priority to Korean Patent Application No. 10-2013-0109374, filed on Sep. 11, 2013, and all the benefits accruing therefrom under 35 U.S.C. §119, the content of which are incorporated by reference herein in its entirety.

BACKGROUND

1. Field

Exemplary embodiments relate to a liquid crystal display apparatus and a method of manufacturing the liquid crystal display apparatus. More particularly, exemplary embodiments relate to a liquid crystal display apparatus including a phase difference compensation film with improved hardness.

2. Description of the Related Art

A liquid crystal display apparatus is one of the most widely used types of flat panel display. The flat panel display includes, but are not limited to, a liquid crystal display ("LCD"), a plasma display panel ("PDP") and an organic light emitting display ("OLED").

The LCD apparatus applies voltages to molecules of liquid crystal to convert arrangements of the molecules and change optical characteristics of the liquid crystal cell such as birefringence, optical activity, dichroism and light scattering, for example, to display an image.

The LCD apparatus displays an image by a liquid crystal. The LCD apparatus is typically thin and light-weighted, low power consumption and low driving voltage.

Generally, the LCD apparatus includes a liquid crystal display panel and a backlight assembly. The LCD panel displays an image by controlling a light transmittance of the liquid crystal. The backlight assembly is typically disposed on a lower surface of the LCD panel and provides light to the LCD panel. The backlight assembly typically generates non-polarized light.

In such an LCD apparatus, where the backlight assembly generates non-polarized light, the LCD apparatus further includes a polarizing plate, which polarizes the light from the backlight assembly. However, the polarizing plate generally has a thick thickness and a manufacturing cost thereof is typically high.

SUMMARY

Exemplary embodiments provide a liquid crystal display apparatus including a phase difference compensation film with improved hardness by including a fluorine resin.

Exemplary embodiments also provide a method of manufacturing a liquid crystal display apparatus.

In accordance with an exemplary embodiment, a liquid crystal display apparatus includes a first substrate, a second substrate disposed opposite to the first substrate, a liquid crystal layer and a phase difference compensation film disposed on the first substrate, where the phase difference compensation film includes a fluorine resin.

In an exemplary embodiment, a fluorine atom ratio of a surface portion of the phase difference compensation film may be about 20 atomic percent (at %) to about 30 at % based on total atoms of the surface portion of the phase difference compensation film.

In an exemplary embodiment, the fluorine resin may include polytetrafluoro ethylene ("PTFE"), fluorinated ethylene propylene ("FEP"), perfluoroalkoxy ("PFA"), ethylene-tetrafluoroethylene ("ETFE"), polyvinylidene fluoride ("PVDF"), ethylene-chlorotrifluoro ethylene ("ECTFE"), polychlorotrifluoroethylene ("PCTFE") or a combination thereof.

In an exemplary embodiment, the phase difference compensation film may be disposed on a lower surface of the first substrate.

In an exemplary embodiment, the phase difference compensation film may be disposed on an upper surface of the second substrate.

In an exemplary embodiment, the phase difference compensation film may be disposed on a lower surface of the first substrate and an upper surface of the second substrate.

In an exemplary embodiment, the liquid crystal display apparatus may further include a black matrix disposed on the second substrate, and the phase difference compensation film may be disposed between the second substrate and the black matrix.

In an exemplary embodiment, the liquid crystal display apparatus may further include a black matrix disposed on the second substrate, and the phase difference compensation film may be disposed on the second substrate and the black matrix.

In an exemplary embodiment, the liquid crystal display apparatus may further include an over-coating layer disposed on the second substrate. The phase difference compensation film may be disposed on the over-coating layer.

In an exemplary embodiment, the liquid crystal display apparatus may further include a common electrode disposed on the second substrate, and the phase difference compensation film may be disposed on the common electrode.

In an exemplary embodiment, the phase difference compensation film may further include a reactive mesogen including a fluorine functional group.

In an exemplary embodiment, a thickness of the phase difference compensation film may be equal to or less than about 10 micrometers ($\mu$m).

In an exemplary embodiment, a hardness of the phase difference compensation film may be equal to or greater than about 2H in pencil hardness.

In an exemplary embodiment, a surface energy of the phase difference compensation film may be equal to or less than about 25 millinewtons per meter (mN/m).

In accordance with an exemplary embodiment, a method of manufacturing a liquid crystal display apparatus includes coating a retarder composition including a fluorine resin on a substrate to form a retarder coating layer, heating the retarder coating layer, exposing the retarder coating layer to light such that the retarder coating layer has an optical anisotropy and heating the retarder coating layer to form a phase difference compensation film.

In an exemplary embodiment, the substrate may be a first substrate of the liquid crystal display apparatus or a second substrate facing the first substrate of the liquid crystal display apparatus, which is disposed opposite to the first substrate.

In an exemplary embodiment, the retarder composition may include about 10% by weight to about 30% by weight of the fluorine resin, about 20% by weight to about 40% by weight of a reactive mesogen, about 1% by weight to about 10% by weight of a photo-curing monomer, about 10% by weight to about 10% by weight of a heat-curing agent and about 10% by weight to about 30% by weight of a solvent.

In an exemplary embodiment, the retarder composition may be coated on a lower surface of the first substrate.

In an exemplary embodiment, the retarder composition may be coated on an upper surface of the second substrate.

In an exemplary embodiment, the retarder composition may be coated on a lower surface of the first substrate and an upper surface of the second substrate.

In exemplary embodiments of the invention, a phase difference compensation film includes a fluorine resin, such that hardness, anti-fouling and scratch resistance of the phase difference compensation film are substantially improved. Therefore, the phase difference compensation film may not be easily damaged.

In such embodiments, the phase difference compensation film may be directly formed on substrates or therebetween, such that manufacture cost may be reduced. The phase difference compensation film may be formed to be thin, such that an etching process, which reduces a thickness of a cell, may be omitted. Thus, manufacture cost and productivity may be improved. In such embodiments, the phase difference compensation film may be hardened before injecting a liquid crystal, such that a liquid crystal may not be damaged by the phase difference compensation film. A transparent conductive layer may be formed on the phase difference compensation film, such that the phase difference compensation film may not be damaged. Thus, a display quality of the liquid crystal display apparatus may be improved.

BRIEF DESCRIPTION OF THE DRAWINGS

The disclosure will become more apparent by describing in detailed exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means in an acceptable range of deviation for the particular value as determined by one of ordinary skill in the art, considering the measurement in question and the error associated with measurement of the particular quantity (i.e., the limitations of the measurement system). For example, "about" can mean in one or more standard deviations, or in ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 1:
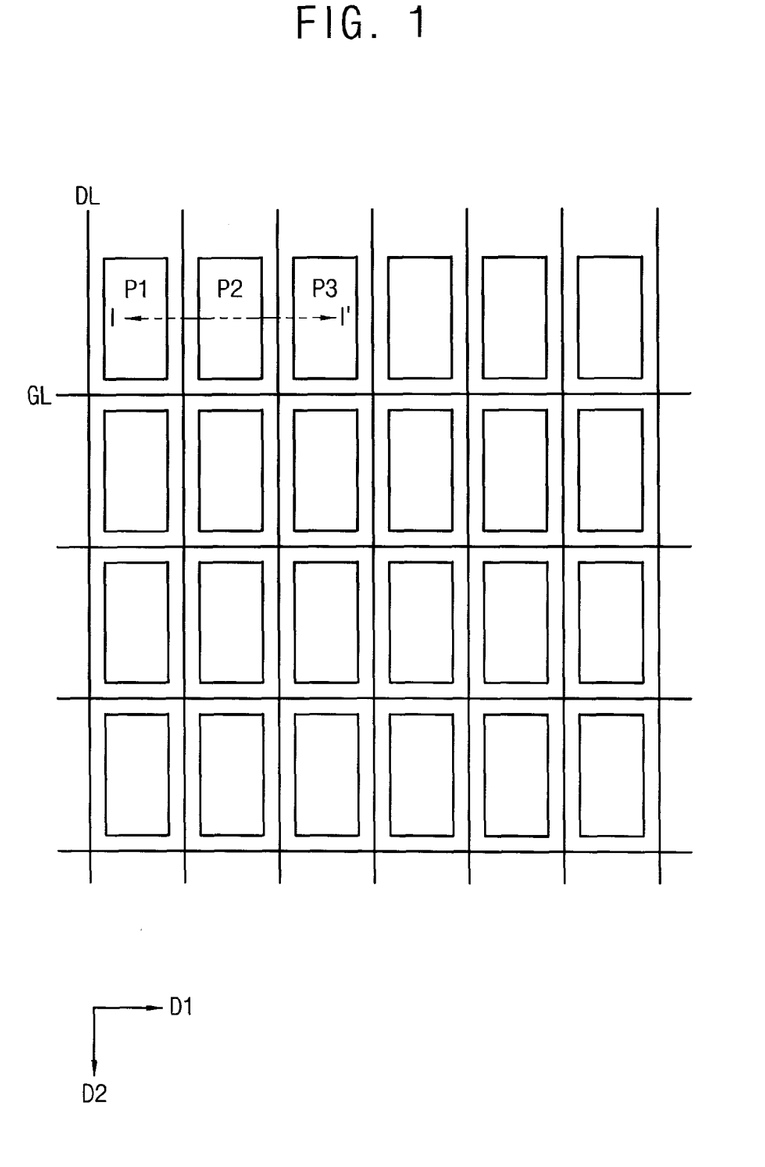
FIG. 1 is a block diagram illustrating an exemplary embodiment of a liquid crystal display apparatus, according to the invention.
Figure 2:
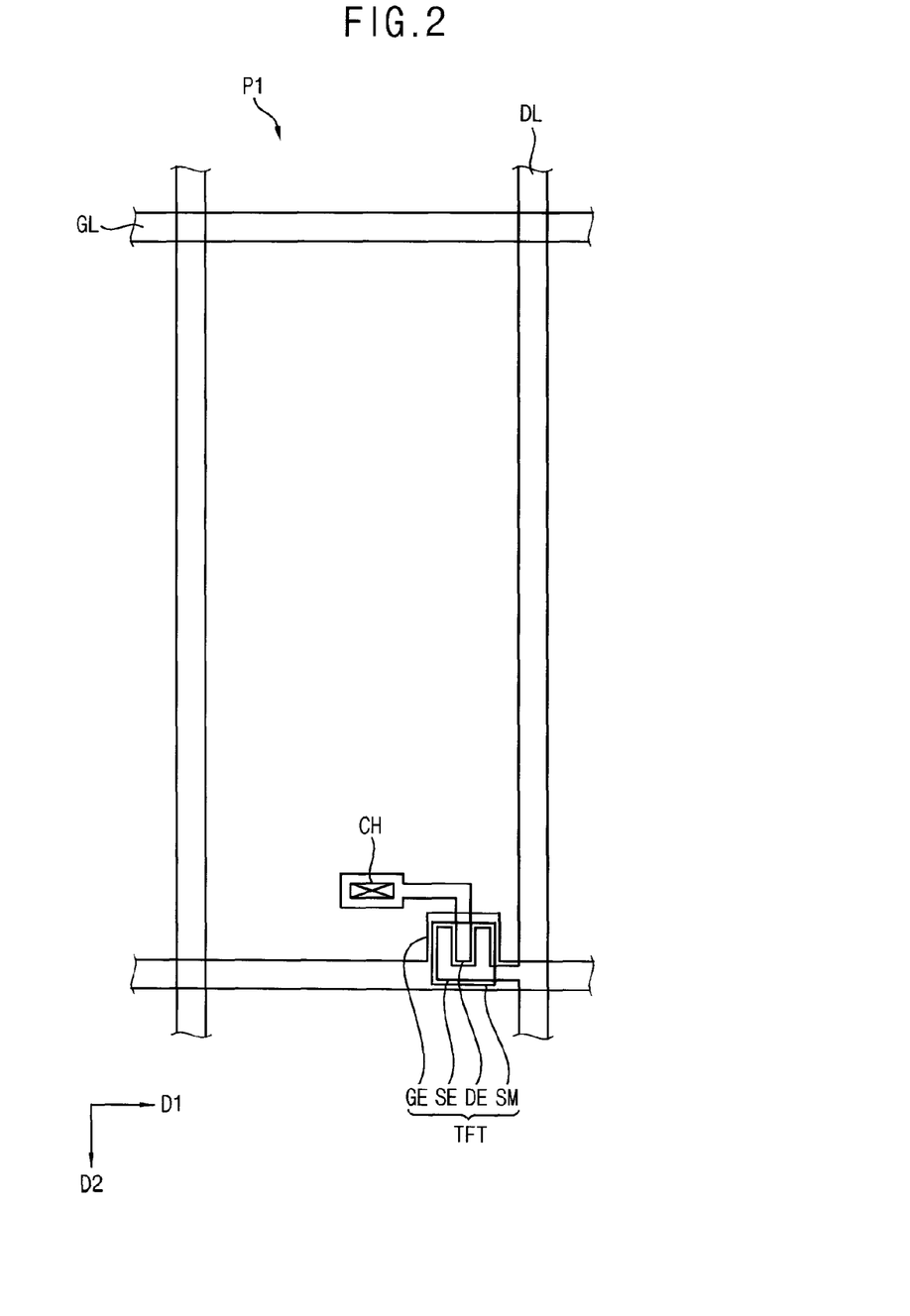
FIG. 2 is a plan view of a pixel illustrated in FIG. 1, according to the invention.
Figure 3:
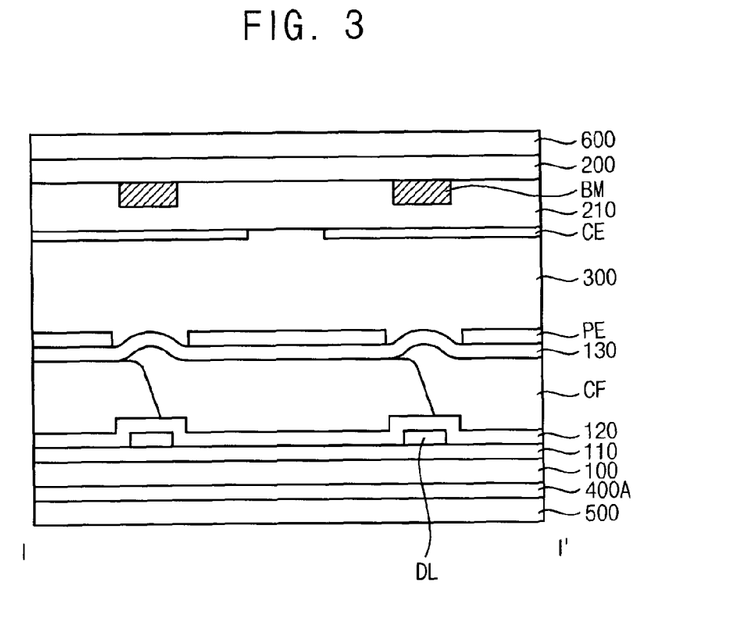
FIG. 3 is a cross-sectional view taken along line I-I' in FIG. 1.

FIG. 1 is a block diagram illustrating an exemplary embodiment of a liquid crystal display apparatus, according to the invention. FIG. 2 is a plan view of a pixel, e.g., a first pixel P1, illustrated in FIG. 1, according to the invention. FIG. 3 is a cross-sectional view taken along line I-I' in FIG. 1.

Referring to FIG. 1, an exemplary embodiment of a display panel includes a plurality of gate lines GL, a plurality of data lines DL and a plurality of pixels, e.g., first to third pixels P1 to P3.

The gate lines GL may extend substantially in a first direction D1. The data lines DL may extend substantially in a second direction D2, which is perpendicular to the first direction D1. Alternatively, the gate lines GL may extend substantially in the second direction D2 and the data lines DL may extend substantially in the first direction D1.

The pixels may be arranged substantially in a matrix form. In one exemplary embodiment, for example, the pixels may be disposed in areas defined by the gate lines GL and the data lines DL, but not being limited thereto.

Each pixel may be connected to a corresponding gate line GL and a corresponding data line DL adjacent thereto.

Each pixel may have a rectangle shape extending substantially in the second direction D2. Alternatively, the pixel may have a V-shape or a Z-shape, for example.

Referring to FIGS. 2 and 3, a liquid crystal display apparatus include a first substrate 100, a second substrate 200 disposed opposite to the first substrate 100, a liquid crystal layer 300 disposed between the first and second substrates 100 and 200, a phase difference compensation film 400A, a first polarizing plate 500 and a second polarizing plate 600.

The first substrate 100 may be a transparent insulation substrate. In one exemplary embodiment, for example, the first substrate 100 be a glass substrate or a transparent plastic substrate. The first substrate 100 may include a plurality of pixel areas for displaying an image. A plurality of the pixel areas may be disposed substantially in a matrix form having a plurality of rows and a plurality of columns.

Each of the pixels in the pixel areas may further include a switching element. In one exemplary embodiment, for example, the switching element may be a thin film transistor TFT. The switching element may be connected to the corresponding gate line GL and the corresponding data line DL adjacent thereto. The switching element may be disposed at a crossing area of the gate line GL and the data line DL.

A gate pattern may include a gate electrode GE and the gate line GL. The gate pattern may be disposed on the first substrate 100. The gate line GL is electrically connected to the gate electrode GE.

The gate insulation layer 110 may be disposed on the first substrate 100 to cover the gate pattern on the first substrate 100, and may insulate the gate pattern.

A semiconductor pattern SM may be disposed on the gate insulation layer 110. The semiconductor pattern SM may overlap the gate electrode GE.

A data pattern may include the data line DL, a source electrode SE and a drain electrode DE. The data pattern may be disposed on the semiconductor pattern SM, which is on the gate insulation layer 110. The source electrode SE may overlap the semiconductor pattern SM. The source electrode SE may be electrically connected to the data line DL.

The drain electrode DE may be spaced apart from the source electrode SE on the semiconductor pattern SM. The semiconductor pattern SM may have a conductive channel between the source electrode SE and the drain electrode DE.

The thin film transistor TFT may include the gate electrode GE, the source electrode SE, the drain electrode DE and the semiconductor pattern SM.

The data line DL may be disposed on the gate insulation layer 110. The gate insulation layer 110 may be disposed substantially on an entire surface of the first substrate 100.

The gate insulation layer 110 may include an organic insulation material or an inorganic insulation material. In one exemplary embodiment, for example, the gate insulation layer 110 may include benzocyclobutene polymer, olefin polymer, polyimide polymer, acryl polymer, polyvinyl polymer, siloxane polymer, silicon polymer, or a combination thereof.

The data insulation layer 120 may be disposed on the gate insulation layer 110 to cover the data pattern on the gate insulation layer. The data insulation layer 120 may insulate the data pattern.

The data insulation layer 120 may be disposed on the gate line GL, the data line DL and the switching element. The data insulation layer 120 may be disposed substantially on an entire surface of the first substrate 100. The data insulation layer 120 may include an organic insulation material or an inorganic insulation material. In one exemplary embodiment, for example, the data insulation layer 120 may include benzocyclobutene polymer, olefin polymer, polyimide polymer, acryl polymer, polyvinyl polymer, siloxane polymer, silicon polymer, or a combination thereof.

The color filter layer CF may be disposed on the data insulation layer 120.

The color of light may be changed by the color filter layer CF and the light may be transmitted to the liquid crystal layer 300 through the color filter layer CF. The color filter layer CF may include a plurality of color filters including a red color filter, green color filter and a blue color filter.

Each color filter may correspond to one of the pixel areas. Adjacent color filters may have different colors from each other.

In an exemplary embodiment, color filters adjacent to each other may partially overlap each other on a border between corresponding pixel areas adjacent to each other. Alternatively, the color filters may be spaced apart from a border between the corresponding pixel areas adjacent to each other, that is, the color filters may be disposed in an island shape.

The liquid crystal display apparatus may include a first over-coating layer 130 disposed on the color filter layer CF.

The first over-coating layer 130 disposed on the color filter layer CF may have a substantially planarized surface.

The first over-coating layer 130 may include an organic insulation material or an inorganic insulation material. In one exemplary embodiment, for example, the first over-coating layer 130 may include benzocyclobutene polymer, olefin polymer, polyimide polymer, acryl polymer, polyvinyl polymer, siloxane polymer, silicon polymer, or a combination thereof.

A pixel electrode PE may be disposed on the first over-coating layer 130.

The pixel electrode PE may be electrically connected to the thin film transistor TFT by a contact hole CH defined through the first over-coating layer 130, the color filter CF and the data insulation layer 120. The pixel electrode PE may be disposed in a pixel area. A gray scale voltage is applied to the pixel electrode PE through the thin film transistor TFT. In one exemplary embodiment, for example, the pixel electrode PE may include a transparent conductive material such as indium tin oxide ("ITO"), indium zinc oxide ("IZO"), aluminum zinc oxide ("AZO"), or a combination thereof. In one exemplary embodiment, for example, the pixel electrode PE may include a slit pattern.

The second substrate 200 may be a transparent insulation substrate. In one exemplary embodiment, for example, the second substrate 200 may be a glass substrate or a transparent plastic substrate. The second substrate 200 may include a black matrix BM disposed in a region where a signal line connected to the thin film transistor TFT is disposed. The black matrix BM overlaps the signal line to block light.

The black matrix BM may be disposed in a region where the gate line GL, the data line DL and the switching element are disposed on the first substrate 100. The black matrix BM may include chromium (Cr) or chromium oxide, for example.

The black matrix BM may overlaps a plurality of gate lines extending substantially in a first direction D1 to block light. The black matrix BM may be disposed on a non-display area of the pixel area.

The liquid crystal display apparatus may include a second over-coating layer 210 disposed on the black matrix BM.

The second over-coating layer 210 on the black matrix BM may have a planarized surface.

The second over-coating layer 210 may include an organic insulation material or an inorganic insulation material. In one exemplary embodiment, for example, the second over-coating layer 210 may include benzocyclobutene polymer, olefin polymer, polyimide polymer, acryl polymer, polyvinyl polymer, siloxane polymer, silicon polymer, for a combination thereof.

A common electrode CE may be disposed on the second over-coating layer 210.

The gray scale voltage is applied to the pixel electrode PE and the common electrode CE to generate an electric field therebetween. In one exemplary embodiment, for r example, the common electrode CE may include a transparent conductive material such as ITO, IZO, and AZO, for example. In one exemplary embodiment, for example, the common electrode CE may include a slit pattern.

The liquid crystal layer 300 may be disposed between the first substrate 100 and the second substrate 200.

The liquid crystal layer 300 may include a liquid crystal molecule. An alignment of the liquid crystal molecule in the liquid crystal layer 300 may be controlled by the electric field generated between the first substrate 100 and the second substrate 200, thereby controlling a light transmittance of a pixel corresponding to the liquid crystal molecule.

In an exemplary embodiment, the liquid crystal display apparatus may have a structure such as a color filter-on-array ("COA") structure. In the COA structure, as shown in FIG. 3, the color filter layer CF is disposed on a lower surface of the liquid crystal layer 300 and the black matrix BM is disposed on an upper surface of the liquid crystal layer 300. Alternatively, the liquid crystal display apparatus has a black matrix-on-array ("BOA") structure. In the BOA structure, the color filter layer CF and the black matrix BM are disposed on the lower surface of the liquid crystal layer 300.

In an exemplary embodiment, the liquid crystal display apparatus may include an alignment layer (not illustrated) to align liquid crystal molecules in a liquid crystal layer 300 in a predetermined direction.

The alignment layer (not illustrated) may be disposed between the liquid crystal layer 300 and the first over-coating layer 130, and between the liquid crystal layer 300 and the second over-coating layer 210.

The alignment layer pre-tilts the liquid crystal molecules in the liquid crystal layer 300. The alignment layer may be formed using an alignment liquid. The alignment liquid may be provided on the first substrate 100 and the second substrate 200, and then the alignment liquid may be partially removed. The alignment liquid may be coated by a slit coating or a spin coating, for example. The alignment liquid may be partially removed at a room temperature or by heating. The alignment liquid may be obtained by mixing an alignment material, such as polyimide, for example, with a solvent.

In an exemplary embodiment, the alignment layer may be omitted in accordance with a type of the liquid crystal layer 300 or a structure of the pixel electrode PE and the common electrode CE. In one exemplary embodiment, for example, where the pixel electrode PE has a micro slit, the liquid crystal molecules may be aligned without the alignment layer, and thus, the alignment layer may be omitted. In an alternative exemplary embodiment, where a reactive mesogen layer for the liquid crystal alignment is provided, the alignment layer may be omitted.

In an exemplary embodiment, the liquid crystal display apparatus includes a phase difference compensation film 400A, which is disposed on a lower surface of the first substrate 100.

The phase difference compensation film 400A may include a fluorine resin, for example.

In an exemplary embodiment, the phase difference compensation film 400A may be provided by coating a retarder composition on the lower surface of the first substrate 100 to form a retarder coating layer.

In such an embodiment, the retarder composition may include a fluorine resin, a reactive mesogen, a photo-curing monomer, a heat-curing agent and a solvent, for example.

The retarder composition may include about 10% by weight to about 30% by weight of the fluorine resin, about 20% by weight to about 40% by weight of a reactive mesogen, about 1% by weight to about 10% by weight of a photo-curing monomer, about 10% by weight to about 10% by weight of a heat-curing agent and about 10% by weight to about 30% by weight of a solvent.

In such an embodiment, the phase difference compensation film 400A may include the fluorine resin to improve hardness, anti-fouling and scratch resistance thereof.

The fluorine resin may be a compound in which a hydrogen position is substituted by a fluorine atom.

In one exemplary embodiment, for example, the fluorine resin may include, but are not limited to, polytetrafluoroethylene ("PTFE"), fluorinated ethylene propylene ("FEP"), perfluoroalkoxy ("PFA"), ethylene-tetrafluoroethylene ("ETFE"), polyvinylidene fluoride ("PVDF"), ethylene-chlorotrifluoro ethylene ("ECTFE"), polychlorotrifluoroethylene ("PCTFE") or a combination thereof.

The retarder composition including the fluorine resin may be coated on the lower surface of the first substrate 100. A fluorine atom ratio of a surface portion of the phase difference compensation film 400A may be in a range of about 20 at % to about 30 at % based on total atoms of the surface of the phase difference compensation film.

When the fluorine atom ratio is less than about 20 at %, a hardness of the phase difference compensation film 400A is too low to protect a surface from a scratch. When the fluorine atom ratio is greater than about 30 at %, a phase retardation may not effectively occur.

A content of the fluorine resin may be in a range of about 10 wt % to about 30 wt % based on total content of the retarder composition. When a content of the fluorine resin is less than about 10 wt %, hardness may be equal or less than 2H in pencil hardness. When a content of the fluorine resin is greater than 30 wt %, a phase retardation may not effectively occur.

In such an embodiment, the reactive mesogen may have a specific phase. The reactive mesogen may be a photo-curing reactive mesogen. The reactive mesogen may include an aliphatic ring or an aromatic ring, for example. The reactive mesogen may include a plurality of functional groups at a terminal.

When the reactive mesogen is irradiated to light such as an ultraviolet ("UV") ray, a plurality of reactive mesogens may react with an initiator, to thereby form an oligomer, a polymer and a mixture thereof.

Thus, at least one of the functional groups may include a light reacting group. In one exemplary embodiment, for example, the light reacting group may be an acrylate group, a methacrylate group, an epoxy group, an oxethane group, a vinyl-ether group, a styrene group, or a thiolene group.

A content of the reactive mesogen may be in a range of about 20 wt % to about 40 wt % based on total content of the retarder composition. When a content of the reactive mesogen is less than about 20 wt %, a phase retardation may not effectively occur. When a content of the reactive mesogen is greater than about 40 wt %, a flexibility of the retarder coating layer may be decreased.

In such an embodiment, the photo-curing monomer may be an acrylate monomer. When a UV ray irradiates to the acrylate monomer, the acrylate monomer may react with the reactive mesogen to harden the retarder coating layer.

In one exemplary embodiment, for example, the acrylate monomer may be, but are not limited to, dipentaerythritol hexaacrylate, dicyclopentadiene acrylate, dicyclopentadiene methacrylate, trimethylpropane triacrylate, glycidyl methacrylate, diethylene glycol dimethacrylate, ethylene glycol acrylate, ethylene glycol dimethacrylate, or a combination thereof.

A content of the photo-curing monomer may be in a range of about 1 wt % to about 10 wt % based on total content of the retarder composition. When a content of the photo-curing monomer is less than about 1 wt %, a stability of the retarder coating layer may decrease. When a content of the photo-curing monomer is greater than 10 wt %, a flexibility of the retarder coating layer may be decreased.

In such an embodiment, when the heat-curing agent is heated, the heat-curing agent may react with the reactive mesogen to thereby harden the retarder coating layer.

In one exemplary embodiment, for example, the heat-curing agent may include, but are not limited to, an amine curing agent, an anhydride curing agent or an imidazole curing agent. The heat-curing agent may be determined based on a processing temperature.

In one exemplary embodiment, for example, the heat-curing agent may include, but are not limited to, diaminodiphenylmethane ("DDM"), diaminodiphenylsulfone ("DDS"), tetrahydrophthalic anhydride ("THPA"), hexahydrophthalic anhydride ("HHPA"), methyltetrahydrophthalic anhydride ("MeTHPA"), nadicmethyl anhydride ("NMA"), hydrolized methylnadic anhydride ("HNMA"), phthalic anhydride ("PA"), 2-phenyl-4-methyl-hydroxymethylimidazole, 3-(3, 4-dichlorophenyl)-1,1-dimethylurea ("DCMU"), sulphonium salt, phosphonium salt, an active ester of biphenylether block carboxylic acid or polyvalent carboxylic acid, 1-cyanoethyl 2-phenyl imidazole ("TCI"), 1,1-dimethoxy-N,N-dimethylmethanamine, 1-phenylethylamine, 2-(diethoxylamino)ethylamine, 2-phenylethylamine, 3-methoxypropylamine, butylamine, cyclohexylamine, 1-phenylpropylamine, di(2-ethylhexyl)amine, dibutylamine, diethylamine, diethylenetriamine, dimethylethylamine, dipropylamine, dipropylenetriamine, isopropylamine, N,N-bis-(3-aminepropyl)methylamine, N,N-dimethylisopropylamine, N-ethyldiisopropylamine, N-octylamine, N-3-amine-3-(2-amino ethyl amino)propylamine, propylamine, tributylamine, tripropylamine, Tris-(2-ethylhexyl)amine, tert-butylamine, di-isopropanolamine, methyldiethanolamine, N,N-dimethylisopropanolamine, N-methylethanolamine, 2,6-xylidine, N-ethyl-N-(2-hydroxyethyl)aniline, ethylenediamine, isophorone diamine, ethylethanolamine, N-(2-aminoethyl)ethanolamine, triisopropanolamine, diethylenetriamine, ethylenediamine, N-(2-aminethyl)ethanolamine, 1-methoxylimidazole, 1-vinylimidazole, N,N-dimethylisopropanolamine, N-ethyl-N-(2-hydroxyethyl)aniline, 1-methylimidazole, N,N-dimethylcyclohexylamine, trimethylaminoethylethanolamine, a mixture thereof.

A content of the heat-curing agent may be in a range of about 1 wt % to about 10 wt % based on total content of the retarder composition. When a content of the heat-curing agent is less than about 1 wt %, a stability of the retarder coating layer may decrease. When a content of the heat-curing agent is greater than about 10 wt %, a flexibility of the retarder coating layer may be decreased.

In such an embodiment, the solvent may be a ketone solvent, a hydrocarbon solvent or an alcohol solvent, for example.

In one exemplary embodiment, for example, the ketone solvent may include, but are not limited to, acetone, methyl ethyl ketone, cyclopentanone, cyclohexanone or cycloheptanone. In one exemplary embodiment, for example, the hydrocarbon solvent may include, but are not limited to, hexane, benzene, toluene, xylene or anisole. In one exemplary embodiment, for example, the alcohol solvent may include, but are not limited to, methanol, ethanol, isopropanol, n-butanol or isobutanol.

A content of the solvent may be in a range of about 10 wt % to about 30 wt % based on total content of the retarder composition. When a content of the solvent is less than about 10 wt %, a viscosity of the retarder composition may be too high, such that a uniformity of the phase difference compensation film 400A may be decreased. When a content of the solvent is greater than about 30 wt %, a viscosity of the retarder composition may be too low, such that a thickness of the phase difference compensation film 400A may become substantially thin.

The retarder composition may further include a photo-polymerization initiator. The photo-polymerization initiator may decomposed by light to thereby generate a radical. Thus, the photo-polymerization initiator may activate the photo-curing monomer.

In one exemplary embodiment, for example, the photo-polymerization initiator may include, but are not limited to, a benzoin compound, an acetophenone compound, a diethoxy-acetophenone compound, a hydroxy-acetophenone compound, a benzophenone compound, a thioxanthone compound, an anthraquinone compound, an α-acyloxime ester compound, a phenylglyoxylate compound, a benzyl compound, an azo compound, a diphenylsulfide compound, an acylphosphine oxylate compound, an organic pigment compound, an iron-phthalocyanine compound or a combination thereof.

In one exemplary embodiment, for example, the photo-polymerization initiator may include, but are not limited to, 1-phenyl-2-hydroxy-2-methyl propane-1-one, 1-hydroxy cyclohexyl phenyl ketone, amino acetophenone, benzyl dimethyl ketal, benzoin ether, thioxanthone 2-ethylanthraquinone ("2-ETAQ"), camphorquinone, α-naphthol, 2,4-diethylthioxanthone, trimethylbenzoil diphenylphosphine oxide, benzophenone, 2,2-diethoxyacetophenone, or benzoilisopropylether.

A content of the photo-polymerization initiator may be in a range of about 1 wt % to about 10 wt % based on total content of the retarder composition. When a content of the photo-polymerization initiator is less than about 1 wt %, the retarder composition may not be hardened sufficiently. When a content of the photo-polymerization initiator is greater than about 10 wt %, a flexibility of the retarder coating layer may be decreased.

The fluorine resin may be included in the retarder composition. The retarder composition may be coated on the first substrate 100. The fluorine resin and the reactive mesogen have a different surface energy. Therefore, a phase separation may occur in the retarder composition by exposing light, drying and heating.

Generally, a surface energy of the reactive mesogen may be in a range of about 30 millinewtons per meter (mN/m) to about 45 mN/m, which is high surface energy. In an exemplary embodiment, a surface energy of the phase difference compensation film 400A may be equal to or less than 25 mN/m. In one exemplary embodiment, for example, the surface energy of the phase difference compensation film 400A may be in a range of about 10 mN/m to about 25 mN/m.

A hardness of the phase difference compensation film 400A may be equal to or greater than 2H in pencil hardness. In one exemplary embodiment, for example, the hardness of the phase difference compensation film 400A may be about 2H to about 5H in pencil hardness.

The retarder composition may be coated by a slit coating, an inkjet coating, a roll coating or a spin coating, etc. The retarder composition may be in a liquid state, and a viscosity may be in a range of about 1 millipascal second (mPas) to about 50 mPas.

The retarder coating layer may be heated. The first substrate 100 including the retarder coating layer coated thereon may be dried by a heating apparatus. In one exemplary embodiment, for example, the heating apparatus may be a hot plate. The heating apparatus may set up a surface temperature of the retarder coating layer to be in a range of about 70° C. to about 110° C. When the first substrate 100 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In an exemplary embodiment, the retarder coating layer may have, but are not limited to, a single-layer structure.

Alternatively, the retarder coating layer may have a multilayer structure. In such an embodiment, where the retarder coating layer has the multilayer structure, each layer in the multilayer structure may be exposed by a UV ray having different wavelength.

The retarder coating layer may be heated. The first substrate 100, which is exposed by the UV ray, may be heated by a plasticity apparatus. In one exemplary embodiment, for example, the plasticity apparatus may be an oven. The plasticity apparatus may set up an inner temperature of the plasticity apparatus to be in a range of about 110° C. to about 130° C. When the first substrate 100 is heated, retardation in the retarder coating layer may occur in a direction, which is substantially perpendicular to a UV exposing direction, that is, a direction along which the first substrate 100 is disposed by the UV ray. In such an embodiment, when the first substrate 100 is heated, the retarder coating layer may be substantially or totally hardened, and the optical anisotropy may be amplified.

In such an embodiment, as described above, the phase difference compensation film 400A, which is disposed on the lower surface of the first substrate 100 and includes the fluorine resin, may be formed by the heating.

A thickness of the phase difference compensation film 400A may be equal to or less than about 10 micrometers (μm). In one exemplary embodiment, for example, the thickness of the phase difference compensation film 400A may be equal to or less than about 5 μm.

The phase difference compensation film 400A may further include a reactive mesogen including a fluorine functional group.

The reactive mesogen may include a plurality of fluorine functional groups. The reactive mesogen including a fluorine functional group may be substantially similar to the fluorine resin, such that a phase separation may occur in the retarder composition by exposing light, drying and heating.

The reactive mesogen including a fluorine functional group may have a lower surface energy than a reactive mesogen that does not include a fluorine functional group. In an exemplary embodiment, the reactive mesogen including a fluorine functional group may be disposed on a surface of the phase difference compensation film 400A. In such an embodiment, the reactive mesogen that does not include a fluorine functional group may be disposed to be adjacent to a lower surface of the first substrate 100. The fluorine resin and the reactive mesogen including a fluorine functional group may be disposed between the first substrate 100 and the reactive mesogen that does not include a fluorine functional group. Thus, in such an embodiment, hardness, anti-fouling and scratch resistance of the phase difference compensation film 400A may increase.

The liquid crystal display apparatus may further include the first polarizing plate 500 disposed on a lower surface of the first substrate 100, and the second polarizing plate 600 disposed on an upper surface of the second substrate 200.

In one exemplary embodiment, for example, the first polarizing plate 500 may be attached on the lower surface of the first substrate 100. The first polarizing plate 500 may polarize light provided from a backlight assembly (not illustrated). The first polarizing plate 500 may have a first polarizing axis. Therefore, the first polarizing plate 500 may allow light having the first polarizing axis to pass therethrough among the light provided from the backlight assembly.

In one exemplary embodiment, for example, the second polarizing plate 600 may be attached on the upper surface of the second substrate 200. The second polarizing plate 600 may polarize light which passes through the color filter layer CF and the liquid crystal layer 300. The second polarizing plate 600 may have a second polarizing axis. The second polarizing axis may be perpendicular to the first polarizing axis. Therefore, the second polarizing plate 600 may allow light having the second polarizing axis to pass therethrough among light from the color filter layer CF and the liquid crystal layer 300.

In an exemplary embodiment, the liquid crystal display apparatus may be an on-cell type in which the first polarizing plate 500 disposed on a lower surface of the first substrate 100 and the second polarizing plate 600 disposed on an upper surface of the second substrate 200. Alternatively, the liquid crystal display apparatus may be an in-cell type in which a first polarizing plate and a second polarizing plate are disposed between a first substrate and a second substrate.

Figure 4:
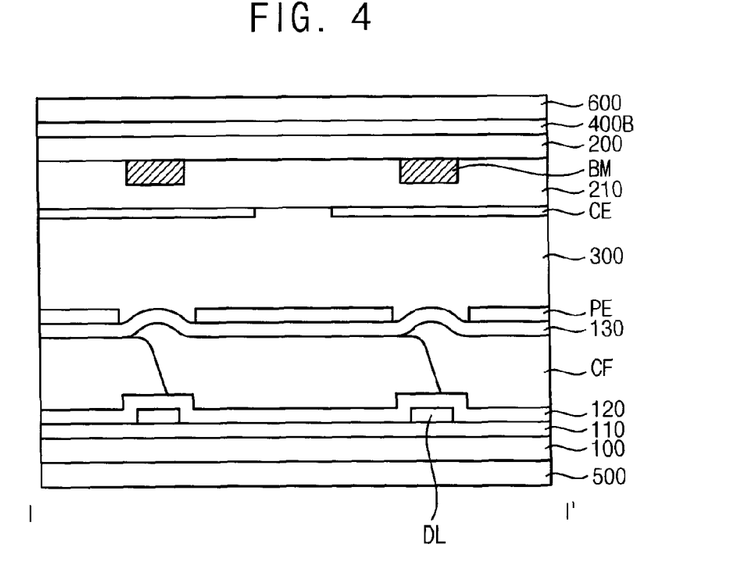
FIG. 4 is a cross-sectional view illustrating an alternative exemplary embodiment of a liquid crystal display apparatus, according to the invention.

FIG. 4 is a cross-sectional view illustrating an alternative exemplary embodiment of a liquid crystal display apparatus, according to the invention.

Referring to FIG. 4, an alternative exemplary embodiment of a liquid crystal display apparatus include a first substrate 100, a second substrate 200, a liquid crystal layer 300, a phase difference compensation film 400B, a first polarizing plate 500 and a second polarizing plate 600.

The liquid crystal display apparatus illustrated in FIG. 4 is substantially the same as the liquid crystal display apparatus illustrated in FIG. 3 except for the phase difference compensation film 400B. The same or like elements shown in FIG. 4 have been labeled with the same reference characters as used above to describe the exemplary embodiments of the liquid crystal display apparatus shown in FIG. 3, and any repetitive detailed description thereof will hereinafter be omitted or simplified.

In an exemplary embodiment, as shown in FIG. 4, the liquid crystal display apparatus includes the phase difference compensation film 400B, which is disposed on an upper surface of the second substrate 200.

In such an embodiment, the phase difference compensation film 400B may include a fluorine resin.

The phase difference compensation film 400B may be provided by coating a retarder composition on the upper surface of the second substrate 200 to form a retarder coating layer.

The retarder composition may include a fluorine resin, a reactive mesogen, a photo-curing monomer, a heat-curing agent and a solvent.

The phase difference compensation film 400B may include the fluorine resin to improve hardness, anti-fouling and scratch resistance thereof.

The fluorine resin may be included in the retarder composition. The retarder composition may be coated on the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In an exemplary, a surface energy of the phase difference compensation film 400B may be equal to or less than 25 mN/m. In one exemplary embodiment, for example, the surface energy of the phase difference compensation film 400B may be in a range of about 10 mN/m to about 25 mN/m.

A hardness of the phase difference compensation film 400B may be equal to or greater than 2H in pencil hardness. In one exemplary embodiment, for example, the hardness of the phase difference compensation film 400B may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The second substrate 200 including the retarder coating layer coated thereon may be dried by a heating apparatus. In one exemplary embodiment, for example, the heating apparatus may be a hot plate. The heating apparatus may set up a surface temperature of the retarder coating layer in a range of 70° C. to 110° C. When the second substrate 200 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy.

In an exemplary embodiment, the retarder coating layer may have, but are not limited to, a single-layer structure.

Alternatively, the retarder coating layer may have a multilayer structure. When the retarder coating layer has the multilayer structure, each layer in the multilayer structure may be exposed by UV rays having different wavelength.

The retarder coating layer may be heated. The second substrate 200, which is exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the second substrate 200 is heated, retardation in the retarder coating layer may occur in a direction, which is perpendicular to a UV exposing direction. In such an embodiment, when the second substrate 200 is heated, the retarder coating layer may be substantially or totally hardened, and the optical anisotropy may be thereby amplified.

In such an embodiment, as described above, the phase difference compensation film 400B, which is disposed on the upper surface of the second substrate 200 and includes the fluorine resin, may be formed by the heating.

A thickness of the phase difference compensation film 400B may be equal to or less than about 10 μm. In one exemplary embodiment, for example, the thickness of the phase difference compensation film 400B may be equal to or less than about 5 μm.

The phase difference compensation film 400B may further include a reactive mesogen including a fluorine functional group.

The reactive mesogen may include a plurality of fluorine functional groups. The reactive mesogen including a fluorine functional group may be substantially similar to the fluorine resin, such that a phase separation may occur in the retarder composition by exposing light, drying and heating.

The reactive mesogen including a fluorine functional group may have a lower surface energy than a reactive mesogen that does not include a fluorine functional group. Accordingly, in an exemplary embodiment, the reactive mesogen including a fluorine functional group may be disposed on a surface of the phase difference compensation film 400B. The reactive mesogen that does not include a fluorine functional group may be disposed to be adjacent to an upper surface of the second substrate 200. The fluorine resin and the reactive mesogen including a fluorine functional group may be disposed between the second substrate 200 and the reactive mesogen that does not include a fluorine functional group. Thus, in such an embodiment, hardness, anti-fouling and scratch resistance of the phase difference compensation film 400B may increase.

Figure 5:
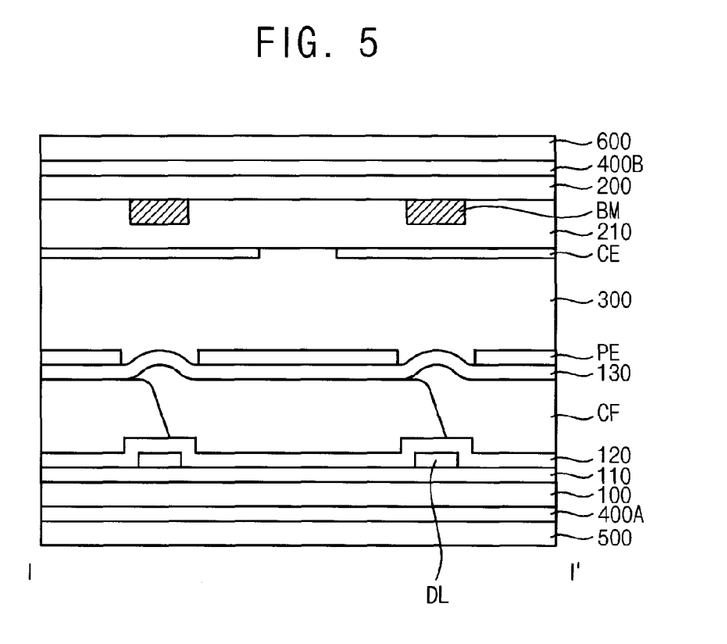
FIG. 5 is a cross-sectional view illustrating another alternative exemplary embodiment of a liquid crystal display apparatus, according to the invention.

FIG. 5 is a cross-sectional view illustrating another alternative exemplary embodiment of a liquid crystal display apparatus, according to the invention.

Referring to FIG. 5, a liquid crystal display apparatus include a first substrate 100, a second substrate 200, a liquid crystal layer 300, phase difference compensation films 400A, 400B, a first polarizing plate 500 and a second polarizing plate 600.

The liquid crystal display apparatus illustrated in FIG. 5 is substantially the same as the liquid crystal display apparatus illustrated in FIG. 3 except for the phase difference compensation films 400A, 400B. The same or like elements shown in FIG. 5 have been labeled with the same reference characters as used above to describe the exemplary embodiments of the liquid crystal display apparatus shown in FIG. 3, and any repetitive detailed description thereof will hereinafter be omitted or simplified.

In accordance with an exemplary embodiment, the liquid crystal display apparatus includes the phase difference compensation films, e.g., a first phase difference compensation film 400A disposed on a lower surface of the first substrate 100, and a second phase difference compensation film 400B disposed on an upper surface of the second substrate 200.

The phase difference compensation films 400A, 400B may include a fluorine resin.

The phase difference compensation films 400A, 400B may be provided by coating a retarder composition may on the lower surface of the first substrate 100 and the upper surface of the second substrate 200 to form a retarder coating layer.

The retarder composition may include a fluorine resin, a reactive mesogen, a photo-curing monomer, a heat-curing agent and a solvent.

The phase difference compensation films 400A, 400B may include the fluorine resin to improve hardness, anti-fouling and scratch resistance thereof.

The fluorine resin may be included in the retarder composition. The retarder composition may be coated on the first substrate and the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In an exemplary embodiment, a surface energy of the phase difference compensation films 400A, 400B may be equal to or less than 25 mN/m. In one exemplary embodiment, for example, the surface energy of the phase difference compensation films 400A, 400B may be in a range of about 10 mN/m to about 25 mN/m.

A hardness of the phase difference compensation films 400A, 400B may be equal to or greater than 2H in pencil hardness. In one exemplary embodiment, for example, the hardness of the phase difference compensation films 400A, 400B may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The first and second substrates 100 and 200 including the retarder coating layer coated thereon, may be dried by a heating apparatus. In one exemplary embodiment, for example, the heating apparatus may be a hot plate. The heating apparatus may set up a surface temperature of the retarder coating layer in a range of 70° C. to 110° C. When the first and second substrates 100 and 200 are heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In an exemplary embodiment, the retarder coating layer may have, but are not limited to, a single-layer.

Alternatively, the retarder coating layer may have a multilayer structure. When the retarder coating layer is the multilayer structure, each layer in the multilayer structure may be exposed by UV rays having different wavelength.

The retarder coating layer may be heated. The first substrate 100 and second substrate 200, which are exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the first substrate 100 and the second substrate 200 are heated, retardation in the retarder coating layer may occur in a direction, which is perpendicular to a UV exposing direction. In such an embodiment, when the first substrate 100 and the second substrate 200 are heated, the retarder coating layer may be substantially or totally hardened, and the optical anisotropy may be thereby amplified.

In such an embodiment, as described above, the first phase difference compensation film 400A, which is disposed on the lower surface of the first substrate 100 and includes the fluorine resin, and the second phase difference compensation film 400B, which is disposed on the upper surface of the second substrate 200 and includes the fluorine resin, may be formed by the heating.

A thickness of the phase difference compensation films 400A, 400B may be equal to or less than about 10 μm. In one exemplary embodiment, for example, the thickness of the phase difference compensation films 400A, 400B may be equal to or less than about 5 μm.

The phase difference compensation films 400A, 400B may further include a reactive mesogen including a fluorine functional group.

The reactive mesogen may include a plurality of fluorine functional groups. The reactive mesogen including a fluorine functional group may be substantially similar to the fluorine resin, such that a phase separation may occur in the retarder composition by exposing light, drying and heating.

The reactive mesogen including a fluorine functional group may have a lower surface energy than a reactive mesogen that does not include a fluorine functional group. Accordingly, in an exemplary embodiment, the reactive mesogen including a fluorine functional group may be disposed on a surface of the phase difference compensation films 400A, 400B. In such an embodiment, the reactive mesogen that does not include a fluorine functional group may be disposed to be adjacent to a lower surface of the first substrate 100 and an upper surface of the second substrate 200. The fluorine resin and the reactive mesogen including a fluorine functional group may be disposed between the first substrate 100 and the reactive mesogen that does not include a fluorine functional group. The fluorine resin and the reactive mesogen including a fluorine functional group may be disposed between the second substrate 200 and the reactive mesogen that does not include a fluorine functional group. Thus, in such an embodiment, hardness, anti-fouling and scratch resistance of the phase difference compensation films 400A, 400B may increase.

Figure 6:
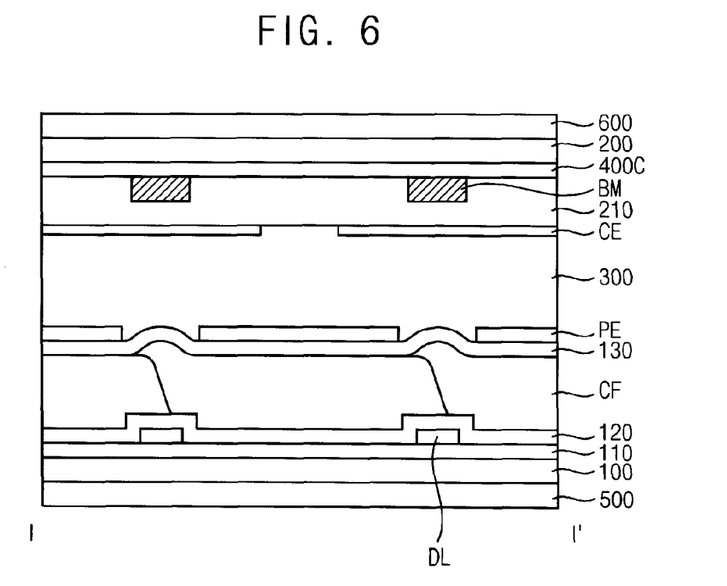
FIG. 6 is a cross-sectional view illustrating another alternative exemplary embodiment of a liquid crystal display apparatus, according to the invention.

FIG. 6 is a cross-sectional view illustrating another alternative exemplary embodiment of a liquid crystal display apparatus, according to the invention.

Referring to FIG. 6, a liquid crystal display apparatus include a first substrate 100, a second substrate 200, a liquid crystal layer 300, a black matrix BM, a phase difference compensation film 400C disposed between the second substrate 200 and the black matrix BM, a first polarizing plate 500 and a second polarizing plate 600.

The liquid crystal display apparatus illustrated in FIG. 6 is substantially the same as the liquid crystal display apparatus illustrated in FIG. 3 except for the phase difference compensation film 400C. The same or like elements shown in FIG. 6 have been labeled with the same reference characters as used above to describe the exemplary embodiments of the liquid crystal display apparatus shown in FIG. 3, and any repetitive detailed description thereof will hereinafter be omitted or simplified.

In an exemplary embodiment, as shown in FIG. 6, the liquid crystal display apparatus includes the phase difference compensation film 400C, which is disposed between the second substrate 200 and the black matrix BM.

The phase difference compensation film 400C may include a fluorine resin.

The phase difference compensation film 400C may be provided by coating a retarder composition on the lower surface of the second substrate 200 to form a retarder coating layer.

The retarder composition may include a fluorine resin, a reactive mesogen, a photo-curing monomer, a heat-curing agent and a solvent.

The phase difference compensation film 400C may include the fluorine resin to improve hardness, anti-fouling and scratch resistance thereof.

The fluorine resin may be included in the retarder composition. The retarder composition may be coated on the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In an exemplary embodiment, a surface energy of the phase difference compensation film 400C may be equal to or less than 25 mN/m. In one exemplary embodiment, for example, the surface energy of the phase difference compensation film 400C may be in a range of about 10 mN/m to about 25 mN/m.

A hardness of the phase difference compensation film 400C may be equal to or greater than 2H in pencil hardness. In one exemplary embodiment, for example, the hardness of the phase difference compensation film 400C may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The second substrate 200 including the retarder coating layer coated thereon may be dried by a heating apparatus. In one exemplary embodiment, for example, the heating apparatus may be a hot plate. The heating apparatus may set up a surface temperature of the retarder coating layer in a range of 70° C. to 110° C. When the second substrate 200 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In accordance with an exemplary embodiment, the retarder coating layer may have, but are not limited to, a single-layer structure.

Alternatively, the retarder coating layer may have a multilayer structure. When the retarder coating layer has the multilayer structure, each layer in the multilayer structure may be exposed by UV rays having different wavelength.

The retarder coating layer may be heated. The second substrate 200, which is exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the second substrate 200 is heated, retardation in the retarder coating layer may occur in a direction, which is perpendicular to a UV exposing direction. In such an embodiment, when the second substrate 200 is heated, such that the retarder coating layer may be substantially or totally hardened, and the optical anisotropy may be amplified.

In such an embodiment, as described above, the phase difference compensation film 400C, which is disposed on the lower surface of the second substrate 200 and includes the fluorine resin, may be formed by the heating.

A thickness of the phase difference compensation film 400C may be equal to or less than about 10 μm. In one exemplary embodiment, for example, the thickness of the phase difference compensation film 400C may be equal to or less than about 5 μm.

The phase difference compensation film 400C may further include a reactive mesogen including a fluorine functional group.

The reactive mesogen may include a fluorine functional group. The reactive mesogen including a fluorine functional group may be substantially similar to the fluorine resin, such that a phase separation may occur in the retarder composition by exposing light, drying and heating.

Figure 7:
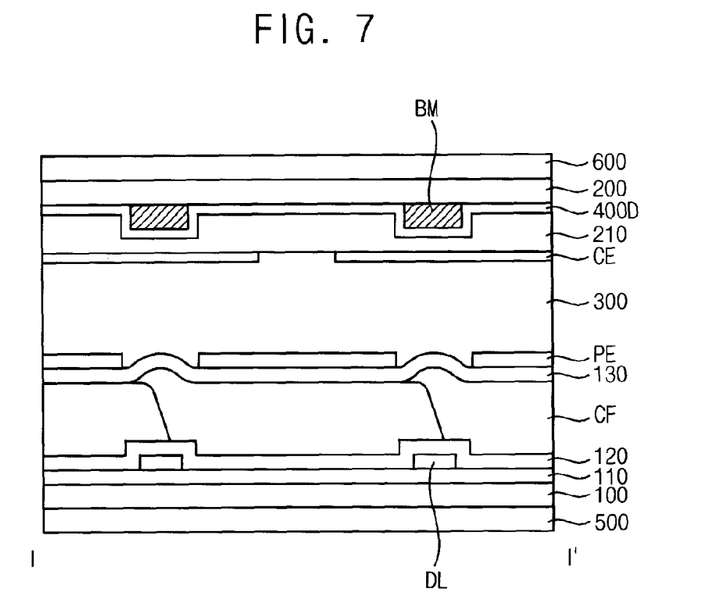
FIG. 7 is a cross-sectional view illustrating another alternative exemplary embodiment of a liquid crystal display apparatus, according to the invention.

FIG. 7 is a cross-sectional view illustrating another alternative exemplary embodiment of a liquid crystal display apparatus, according to the invention.

Referring to FIG. 7, a liquid crystal display apparatus include a first substrate 100, a second substrate 200, a liquid crystal layer 300, a black matrix BM, a phase difference compensation film 400D disposed on the black matrix BM, a first polarizing plate 500 and a second polarizing plate 600.

The liquid crystal display apparatus illustrated in FIG. 7 is substantially the same as the liquid crystal display apparatus illustrated in FIG. 3 except for the phase difference compensation film 400D. The same or like elements shown in FIG. 7 have been labeled with the same reference characters as used above to describe the exemplary embodiments of the liquid crystal display apparatus shown in FIG. 3, and any repetitive detailed description thereof will hereinafter be omitted or simplified.

In an exemplary embodiment, the liquid crystal display apparatus includes the phase difference compensation film 400D, which is disposed on the black matrix BM. The black matrix BM is disposed on the second substrate 200, and the phase difference compensation film 400D is disposed on the second substrate 200 including the black matrix BM disposed thereon.

The phase difference compensation film 400D may include a fluorine resin.

The phase difference compensation film 400D may be provided by coating a retarder composition on the lower surface of the second substrate 200 to form a retarder coating layer.

The retarder composition may include a fluorine resin, a reactive mesogen, a photo-curing monomer, a heat-curing agent and a solvent.

The phase difference compensation film 400D may include the fluorine resin to improve hardness, anti-fouling and scratch resistance thereof.

The fluorine resin may be included in the retarder composition. The retarder composition may be coated on the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In an exemplary embodiment, a surface energy of the phase difference compensation film 400D may be equal to or less than 25 mN/m. In one exemplary embodiment, for example, the surface energy of the phase difference compensation film 400D may be in a range of about 10 mN/m to about 25 mN/m.

A hardness of the phase difference compensation film 400D may be equal to or greater than 2H in pencil hardness. In one exemplary embodiment, for example, the hardness of the phase difference compensation film 400D may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The second substrate 200, which the retarder coating layer is coated, may be dried by a heating apparatus. In one exemplary embodiment, for example, the heating apparatus may be a hot plate. The heating apparatus may set up a surface temperature of the retarder coating layer in a range of 70° C. to 110° C. When the second substrate 200 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In an exemplary embodiment, the retarder coating layer may have, but are not limited to, a single-layer structure.

Alternatively, the retarder coating layer may have a multilayer structure. When the retarder coating layer has the multilayer structure, each layer in the multilayer structure may be exposed by UV rays having different wavelength.

The retarder coating layer may be heated. The second substrate 200, which is exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the second substrate 200 is heated, retardation in the retarder coating layer may occur in a direction, which is perpendicular to a UV exposing direction. In such an embodiment, when the second substrate 200 is heated, the retarder coating layer may be substantially or totally hardened, and the optical anisotropy may be thereby amplified.

In such an embodiment, as described above, the phase difference compensation film 400D, which is disposed on the black matrix BM and includes the fluorine resin, may be formed by the heating.

A thickness of the phase difference compensation film 400D may be equal to or less than about 10 μm. In one exemplary embodiment, for example, the thickness of the phase difference compensation film 400D may be equal to or less than about 5 μm.

The phase difference compensation film 400D may further include a reactive mesogen including a fluorine functional group.

The reactive mesogen may include a plurality of fluorine functional groups. The reactive mesogen including a fluorine functional group may be substantially similar to the fluorine resin, such that a phase separation may occur in the retarder composition by exposing light, drying and heating.

Figure 8:
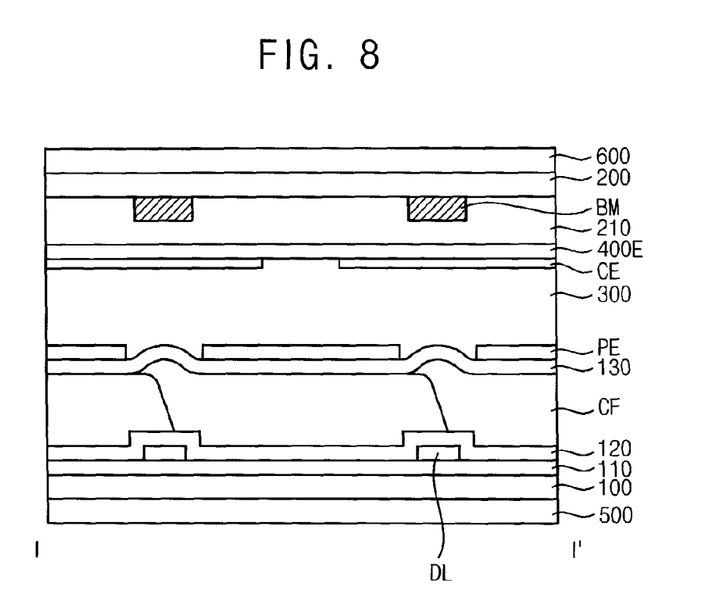
FIG. 8 is a cross-sectional view illustrating another alternative exemplary embodiment of a liquid crystal display apparatus, according to the invention.

FIG. 8 is a cross-sectional view illustrating another alternative exemplary embodiment of a liquid crystal display apparatus, according to the invention.

Referring to FIG. 8, an exemplary embodiment of a liquid crystal display apparatus include a first substrate 100, a first over-coating layer 120, a second substrate 200, a second over-coating layer 210, a liquid crystal layer 300, a black matrix BM, a phase difference compensation film 400E disposed on the second over-coating layer 210, a first polarizing plate 500 and a second polarizing plate 600.

The liquid crystal display apparatus illustrated in FIG. 8 is substantially the same as the liquid crystal display apparatus illustrated in FIG. 3 except for the phase difference compensation film 400E. The same or like elements shown in FIG. 8 have been labeled with the same reference characters as used above to describe the exemplary embodiments of the liquid crystal display apparatus shown in FIG. 3, and any repetitive detailed description thereof will hereinafter be omitted or simplified.

In an exemplary embodiment, as shown in FIG. 8, the liquid crystal display apparatus includes the phase difference compensation film 400E, which is disposed on the second over-coating layer 210. The second over-coating layer 210 is disposed on the second substrate 200, and the phase difference compensation film 400E is disposed on the second substrate 200 including the second over-coating layer 210 disposed thereon.

The phase difference compensation film 400E may include a fluorine resin.

The phase difference compensation film 400E may be provided by coating a retarder composition on the second over-coating layer 210 to form a retarder coating layer.

The retarder composition may include a fluorine resin, a reactive mesogen, a photo-curing monomer, a heat-curing agent and a solvent.

The phase difference compensation film 400E may include the fluorine resin to improve hardness, anti-fouling and scratch resistance thereof.

The fluorine resin may be included in the retarder composition. The retarder composition may be coated on the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In such an embodiment, a surface energy of the phase difference compensation film 400E may be equal to or less than 25 mN/m. In one exemplary embodiment, for example, the surface energy of the phase difference compensation film 400E may be in a range of about 10 mN/m to about 25 mN/m.

A hardness of the phase difference compensation film 400E may be equal to or greater than 2H in pencil hardness. In one exemplary embodiment, for example, the hardness of the phase difference compensation film 400E may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The second substrate 200 including the retarder coating layer coated thereon may be dried by a heating apparatus. In one exemplary embodiment, for example, the heating apparatus may be a hot plate. The heating apparatus may set up a surface temperature of the retarder coating layer in a range of 70° C. to 110° C. When the second substrate 200 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In an exemplary embodiment, the retarder coating layer may have, but are not limited to, a single-layer structure.

Alternatively, the retarder coating layer may have a multilayer structure. When the retarder coating layer has the multilayer structure, each layer in the multilayer structure may be exposed by UV rays having different wavelength.

The retarder coating layer may be heated. The second substrate 200, which is exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the second substrate 200 is heated, retardation in the retarder coating layer may occur in a direction, which is perpendicular to a UV exposing direction. In such an embodiment, when the second substrate 200 is heated, the retarder coating layer may be substantially or totally hardened, and the optical anisotropy may be thereby amplified.

In such an embodiment, as described above, the phase difference compensation film 400E, which is disposed on the second over-coating layer 210 and includes the fluorine resin, may be formed by the heating.

A thickness of the phase difference compensation film 400E may be equal to or less than about 10 μm. In one exemplary embodiment, for example, the thickness of the phase difference compensation film 400E may be equal to or less than about 5 μm.

The phase difference compensation film 400E may further include a reactive mesogen including a fluorine functional group.

In such an embodiment, the reactive mesogen may include a plurality of fluorine functional groups. The reactive mesogen including a fluorine functional group may be substantially similar to the fluorine resin, such that a phase separation may occur in the retarder composition by exposing light, drying and heating.

Figure 9:
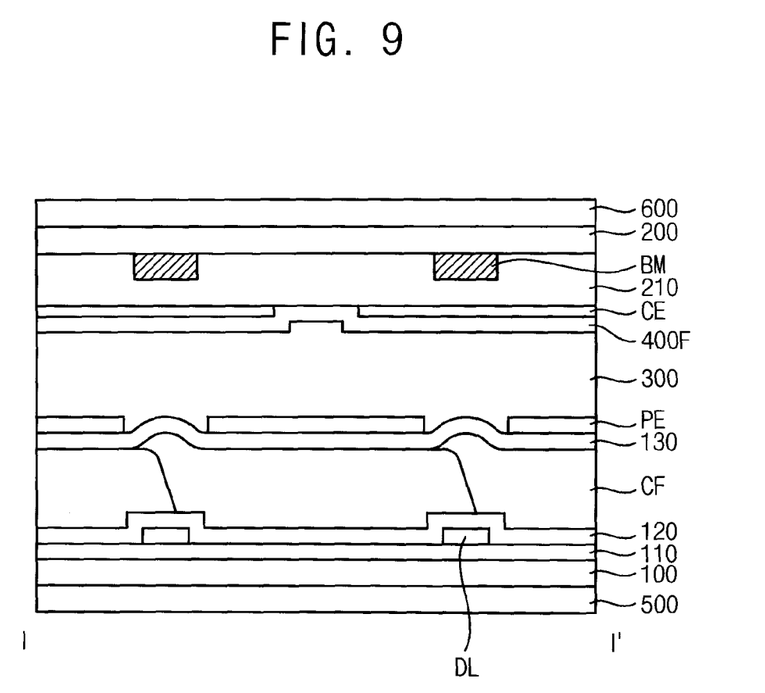
FIG. 9 is a cross-sectional view illustrating another alternative exemplary embodiment of a liquid crystal display apparatus, according to the invention.

FIG. 9 is a cross-sectional view illustrating another alternative exemplary embodiment of a liquid crystal display apparatus, according to the invention.

Referring to FIG. 9, a liquid crystal display apparatus include a first substrate 100, a second substrate 200, a liquid crystal layer 300, a common electrode CE, a phase difference compensation film 400F disposed on the common electrode CE, a first polarizing plate 500 and a second polarizing plate 600.

The liquid crystal display apparatus illustrated in FIG. 9 is substantially the same as the liquid crystal display apparatus illustrated in FIG. 3 except for the phase difference compensation film 400F. The same or like elements shown in FIG. 4 have been labeled with the same reference characters as used above to describe the exemplary embodiments of the liquid crystal display apparatus shown in FIG. 3, and any repetitive detailed description thereof will hereinafter be omitted or simplified.

In an exemplary embodiment, the liquid crystal display apparatus includes the phase difference compensation film 400F, which is disposed on the common electrode CE. The common electrode CE is disposed on the second substrate 200, and the phase difference compensation film 400F is disposed on the second substrate 200 including the common electrode CE disposed thereon.

The phase difference compensation film 400F may include a fluorine resin.

The phase difference compensation film 400F may be provided by coating a retarder composition on the common electrode CE to form a retarder coating layer.

The retarder composition may include a fluorine resin, a reactive mesogen, a photo-curing monomer, a heat-curing agent and a solvent.

The phase difference compensation film 400F may include the fluorine resin to improve hardness, anti-fouling and scratch resistance thereof.

The fluorine resin may be included in the retarder composition. The retarder composition may be coated on the second substrate 200. The fluorine resin and the reactive mesogen have a different surface energy. Therefore, a phase separation may occur in the retarder composition by exposing light, drying and heating.

Generally, a surface energy of the reactive mesogen may be in a range of about 30 mN/m to about 45 mN/m, which is high surface energy. In an exemplary embodiment, a surface energy of the phase difference compensation film 400F may be equal to or less than 25 mN/m. In one exemplary embodiment, for example, the surface energy of the phase difference compensation film 400F may be in a range of about 10 mN/m to about 25 mN/m.

A hardness of the phase difference compensation film 400F may be equal to or greater than 2H in pencil hardness. In one exemplary embodiment, for example, the hardness of the phase difference compensation film 400F may be about 2H to about 5H in pencil hardness.

The retarder composition may be coated by a slit coating, an inkjet coating, a roll coating or a spin coating, for example. The retarder composition may be in a liquid state, and a viscosity may be in a range of about 1 mPas to about 50 mPas.

The retarder coating layer may be heated. The second substrate 200 including the retarder coating layer coated thereon may be dried by a heating apparatus. In one exemplary embodiment, for example, the heating apparatus may be a hot plate. The heating apparatus may set up a surface temperature of the retarder coating layer in a range of 70° C. to 110° C. When the second substrate 200 is heated, the heat-curing agent and the reactive mesogen may react each other, and the solvent in the retarder coating layer may be removed.

Then, the retarder coating layer is exposed by a UV ray. Therefore, the photo-curing monomer, the reactive mesogen may react each other, such that the retarder coating layer may have an optical anisotropy. In an exemplary embodiment, the retarder coating layer may have, but are not limited to, a single-layer structure.

Alternatively, the retarder coating layer may have a multilayer structure. When the retarder coating layer has the multilayer structure, each layer in the multilayer structure may be exposed by UV rays having different wavelength.

The retarder coating layer may be heated. The second substrate 200, which is exposed by the UV ray, may be heated by a plasticity apparatus. In one exemplary embodiment, for example, the plasticity apparatus may be an oven. The plasticity apparatus may set up an inner temperature of the plasticity apparatus in a range of 110° C. to 130° C. When the second substrate 200 is heated, retardation in the retarder coating layer may occur in a direction, which is perpendicular to a UV exposing direction. In such an embodiment, when the second substrate 200 is heated, the retarder coating layer may be substantially or totally hardened, and the optical anisotropy may be thereby amplified.

In such an embodiment, as described above, the phase difference compensation film 400F, which is disposed on the common electrode CE and includes the fluorine resin, may be formed by the heating.

A thickness of the phase difference compensation film 400F may be equal to or less than about 10 μm. In one exemplary embodiment, for example, the thickness of the phase difference compensation film 400F may be equal to or less than about 5 μm.

The phase difference compensation film 400F may further include a reactive mesogen including a fluorine functional group.

The reactive mesogen may include a plurality of fluorine functional groups. The reactive mesogen including a fluorine functional group may be substantially similar to the fluorine resin, such that a phase separation may occur in the retarder composition by exposing light, drying and heating.

In an exemplary embodiment, as described herein, the phase difference compensation film may be directly provided, e.g., formed, on substrates or therebetween, such that a manufacture cost may be reduced. The phase difference compensation film may be provided to have a thin thickness, such that an etching process, which reduces a thickness of a cell, may be omitted. Thus, in such an embodiment, manufacture cost and productivity may be improved. In such an embodiment, the phase difference compensation film may be substantially hardened before injecting a liquid crystal, such that a liquid crystal may not be damaged by the phase difference compensation film. In an exemplary embodiment, a transparent conductive layer may be provided, e.g., formed, on the phase difference compensation film, such that the phase difference compensation film may be effectively protected. Thus, in such an embodiment, display quality of the liquid crystal display apparatus may be substantially improved.

Exemplary embodiments of the liquid crystal display apparatus and the method of manufacturing a liquid crystal display apparatus described herein may apply to various types of display apparatus such as a liquid crystal display apparatus, and an organic light emitting diode apparatus, for example.

Although exemplary embodiments have been described, it is understood that the invention should not be limited to these exemplary embodiments and various changes and modifications can be made by one of those ordinary skilled in the art in the spirit and scope as hereinafter claimed.

What is claimed is:

1. A liquid crystal display apparatus, comprising:
   a first substrate;
   a second substrate disposed opposite to the first substrate;
   a liquid crystal layer disposed between the first substrate and the second substrate; and
   a phase difference compensation film disposed on the first substrate,
   wherein the phase difference compensation film comprises a fluorine resin,
   wherein a fluorine atom ratio of a surface portion of the phase difference compensation film is about 20 at % to about 30 at % based on total atoms of the surface portion of the phase difference compensation film, wherein a content of the fluorine resin is in a range of about 10 wt % to about 30 wt % based on total content of a composition of the phase difference compensation film, and
   wherein a hardness of the phase difference compensation film is equal to or greater than about 2H in pencil hardness.

2. The liquid crystal display apparatus of claim 1, wherein the fluorine resin comprises polytetrafluoroethylene, fluorinated ethylene propylene, perfluoroalkoxy, ethylene-tetrafluoroethylene, polyvinylidene fluoride, ethylene-chlorotrifluoroethylene, polychlorotrifluoroethylene or a combination hereof.

3. The liquid crystal display apparatus of claim 1, wherein the phase difference compensation film is disposed on a lower surface of the first substrate.

4. The liquid crystal display apparatus of claim 1, wherein the phase difference compensation film is disposed on an upper surface of the second substrate.

5. The liquid crystal display apparatus of claim 1, wherein the phase difference compensation film is disposed on a lower surface of the first substrate and an upper surface of the second substrate.

6. The liquid crystal display apparatus of claim 1, further comprising:
   a black matrix disposed on the second substrate,
   wherein the phase difference compensation film is disposed between the second substrate and the black matrix.

7. The liquid crystal display apparatus of claim 1, further comprising:
   a black matrix disposed on the second substrate,
   wherein the phase difference compensation film is disposed on the second substrate and the black matrix.

8. The liquid crystal display apparatus of claim 1, further comprising:
   an over-coating layer disposed on the second substrate,
   wherein the phase difference compensation film is disposed on the over-coating layer.

9. The liquid crystal display apparatus of claim 1, further comprising:
   a common electrode disposed on the second substrate,
   wherein the phase difference compensation film is disposed on the common electrode.

10. The liquid crystal display apparatus of claim 1, wherein the phase difference compensation film further comprises a reactive mesogen comprising a fluorine functional group.

11. The liquid crystal display apparatus of claim 1, wherein a thickness of the phase difference compensation film is equal to or less than about 10 micrometers.

12. The liquid crystal display apparatus of claim 1, wherein a surface energy of the phase difference compensation film is equal to or less than about 25 millinewtons per meter.

* * * * *